(12) United States Patent
Russell

(10) Patent No.: US 10,089,209 B1
(45) Date of Patent: Oct. 2, 2018

(54) SYSTEMS AND METHODS FOR LOCALLY STREAMING APPLICATIONS IN A COMPUTING SYSTEM

(71) Applicant: UIPCO, LLC, San Antonio, TX (US)

(72) Inventor: Ryan Russell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/591,942

(22) Filed: May 10, 2017

Related U.S. Application Data

(60) Provisional application No. 62/337,731, filed on May 17, 2016.

(51) Int. Cl.
| | |
|---|---|
| *G06F 9/44* | (2018.01) |
| *G06F 11/34* | (2006.01) |
| *G06F 3/06* | (2006.01) |
| *G06F 8/61* | (2018.01) |
| *G06F 11/30* | (2006.01) |
| *G06F 8/658* | (2018.01) |

(52) U.S. Cl.
CPC ........ *G06F 11/3433* (2013.01); *G06F 3/0604* (2013.01); *G06F 3/0631* (2013.01); *G06F 3/0644* (2013.01); *G06F 3/0673* (2013.01); *G06F 8/61* (2013.01); *G06F 8/658* (2018.02); *G06F 8/68* (2013.01); *G06F 11/3034* (2013.01)

(58) Field of Classification Search
CPC .......................................................... G06F 9/44
USPC .................................................. 717/169–178
See application file for complete search history.

(56) References Cited

U.S. PATENT DOCUMENTS

| | | | |
|---|---|---|---|
| 7,024,581 B1 * | 4/2006 | Wang ................. | G06F 11/1417 713/2 |
| 8,504,925 B1 * | 8/2013 | Haase .................. | G06F 3/0481 715/746 |
| 2010/0064299 A1 * | 3/2010 | Kacin ................. | G06F 9/45537 719/317 |
| 2016/0191665 A1 * | 6/2016 | Kang ....................... | G06F 3/06 709/205 |

\* cited by examiner

*Primary Examiner* — Jae Jeon
(74) *Attorney, Agent, or Firm* — Fletcher Yoder, P.C.

(57) ABSTRACT

The present disclosure relates generally to a system that includes a storage component that stores data and a processor. The processor may install an application using a portion of the storage component, partition the portion of the storage component from a remaining portion of the storage component, and execute the application via the portion of the storage component.

17 Claims, 3 Drawing Sheets

US 10,089,209 B1

SYSTEMS AND METHODS FOR LOCALLY STREAMING APPLICATIONS IN A COMPUTING SYSTEM

CROSS-REFERENCE TO RELATED APPLICATION

This application claims priority to and the benefit of U.S. Provisional Application No. 62/337,731, entitled "SYSTEMS AND METHODS FOR LOCALLY STREAMING APPLICATIONS IN A COMPUTING SYSTEM," filed May 17, 2016, which is hereby incorporated by reference in its entirety for all purposes.

BACKGROUND

The present disclosure relates generally to systems and methods for maintaining computing systems. More specifically, the present disclosure relates to improving the performance of a computing system as the computing system continuously stores various applications.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a storage component capable of storing data. The system may also include a processor that may install an application using a portion of the storage component, partition the portion of the storage component from a remaining portion of the storage component, and execute the application via the portion of the storage component.

In another embodiment, a non-transitory computer-readable medium that includes computer-executable instructions may cause a processor to receive a request to return to a previous state of a computing system, identify one or more containers in a storage device of the computing system that were added after the previous state, disable the one or more containers, and swap the one or more containers with one or more empty containers.

In yet another embodiment, a method may include receiving, via a processor, a request to set a current state of a computing system as a recovery state, identifying a plurality of applications installed on a storage component of the computing system having a similar manufacturer, type, function, date of creation, or any combination thereof, and creating a partition within the storage component, wherein the partition is configured to store the plurality of applications. The method may then include moving the plurality of applications to the partition of the storage component.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

Figure 1:
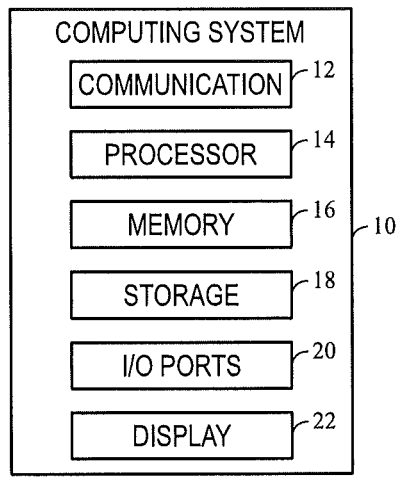
FIG. 1 illustrates a block diagram of a computing system, in accordance with embodiments described herein.
Figure 6:
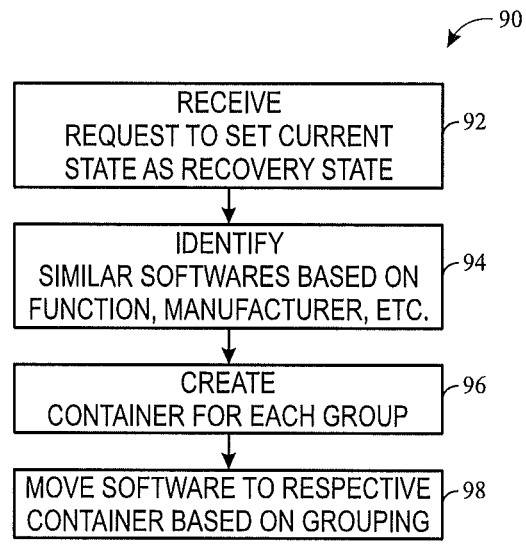
Figure 7:
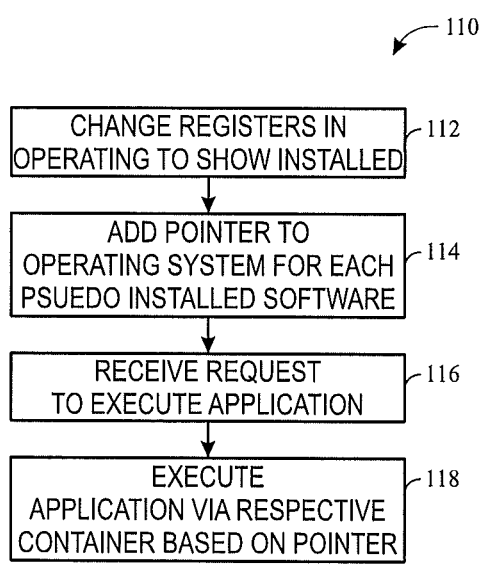

FIG. 6 illustrates a flow chart of a method for organizing data within containers of the storage component of the computing system of FIG. 1, in accordance with embodiments described herein; and FIG. 7 illustrates a flow chart of a method for locally streaming various applications via containers within the storage component of the computing system of FIG. 1, in accordance with embodiments described herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As numerous software applications are installed onto a computer, the computer makes itself more vulnerable to malware, viruses, performance issues, and the like. That is, as new software applications are installed on a computer, certain undesirable software tools or programs may be installed with the new applications. Moreover, some applications may provide entry points for malware or viruses to gain access the computer. For example, when certain applications are installed on a computer, the application may include a daemon or background program that collects various types of information regarding the computer user, the computer usage, or the like. This collection of information takes computing resources away from the applications that a user is attempting to use. As more applications are added to the computer, the performance of the computer may continue to decline due to the undesirable additions.

To enable users to better manage the changes or additional applications that they add to their computers, a computing system in accordance with present embodiments stores each new application installed on the computing device in a separate storage container from each other. That is, the computing system may create a partition in its storage (e.g., hard drive space) for each application installed onto the computing system. As a result, the newly added applications are limited to accessing data available within its respective container, and thus prevented from accessing other applications (e.g., operating system). Moreover, since each new application is added into an individual container, a user may better track how each newly added application affects the overall performance of the computing system. If the user suspects that the performance of the computer system is beginning to decline, the user may disable various applications via their respective containers and analyze how the computing system operates without each respective application. In this way, the user is better equipped to manage the maintenance of his/her respective computing system by managing the containers in which various applications are stored.

By way of introduction, FIG. 1 is a block diagram of example components within an exemplary computing system 10 in accordance with present embodiments. The computing system 10 may include any suitable computer device, such as a general-purpose personal computer, a laptop computer, a tablet computer, a mobile computer, and the like that is configured in accordance with present embodiments. The computing system 10 may include various types of components that may assist the computing system 10 in performing various types of computer tasks and operations. For example, the computing system 10 may include a communication component 12, a processor 14, a memory 16, a storage 18, input/output (I/O) ports 20, a display 22, and the like. The communication component 12 may be a wireless or wired communication component that may facilitate communication between the computing system 10 and various other computing systems via a network, the Internet, or the like.

The processor 14 may be any type of computer processor or microprocessor capable of executing computer-executable code. The processor 14 may also include multiple processors that may perform the operations described below.

The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform the presently disclosed techniques. The memory 16 and the storage 18 may also be used to store the containers of data in accordance with the techniques described herein. In one embodiment, the storage 18 may include hard drive space that may be partitioned into different containers to store different applications, groups of applications, different types of data, and the like. As used herein, applications may include any suitable computer software or program that may be installed onto the computing system 10 and executed by the processor 14. The memory 16 and the storage 18 may represent non-transitory computer-readable media (e.g., any suitable form of memory or storage) that may store the processor-executable code used by the processor 14 to perform various techniques described herein. It should be noted that non-transitory merely indicates that the media is tangible and not a signal.

The I/O ports 20 may be interfaces that may couple to other peripheral components such as input devices (e.g., keyboard, mouse), sensors, input/output (I/O) modules, and the like. The display 22 may operate to depict visualizations associated with software or executable code being processed by the processor 14. In one embodiment, the display 22 may be a touch display capable of receiving inputs from a user of the computing system 10. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the computing system 10.

It should be noted that the components described above with regard to the computing system 10 are exemplary components and the computing system 10 may include additional or fewer components as shown.

Figure 2:
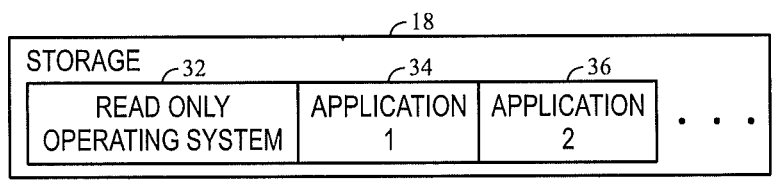
FIG. 2 illustrates a block diagram of a storage component of the computing system of FIG. 1 with containers of data organized in accordance with embodiments described herein.

With the foregoing in mind, FIG. 2 depicts a block diagram of the storage 18 that illustrates how various applications may be stored on the storage 18 or the like in accordance with the techniques described herein. Generally, the computing system 10 may use an operating system to manage the operations and resources of the computing system 10 and to provide common services for various applications. In one embodiment, the processor 14 may store the data related to an operating system in the storage 18 as illustrated in FIG. 2. That is, the processor 14 may store the operating system data in a read-only operating system container 32. In other words, after the operating system is installed onto the computing system 10, the processor 14 may partition the remaining portion of the storage 18 to generate the read-only operating system container 32. The processor 14 may also modify hardware registers associated with the read-only container 32 to indicate to other applications that the data contained within the read-only container 32 is read-only. In this way, other applications may access the operating system data within the read-only container 32 for read operations but are prevented from writing or changing any data stored within the read-only container 32.

As additional applications are added to the computing system 10 or as changes (e.g., updates or patches) are added to the computing system 10, the processor 14 may store each respective application in the storage 18 and partition the remaining portion of the storage 18 from the previously stored data. For example, a first added application may be stored in container 34, which may be separate from the read-only container 32, and a second added application may be stored in container 36, which may be separate from the container 34 and the read-only container 32. As such, each application may be constrained to its respective container. Moreover, since the read-only container 32 is read only, each newly added application may not be able to modify or corrupt the operating system stored in the read-only container 32. Although container 32 is described as being read-only, it should be noted that any container may be configured or designated as read only.

In certain embodiments, the processor 14 may organize data within the storage into different containers based on the application or data type. For instance, FIG. 3 illustrates another block diagram of the storage 18 that depicts how various types of data may be stored within the storage 18.

Figure 3:
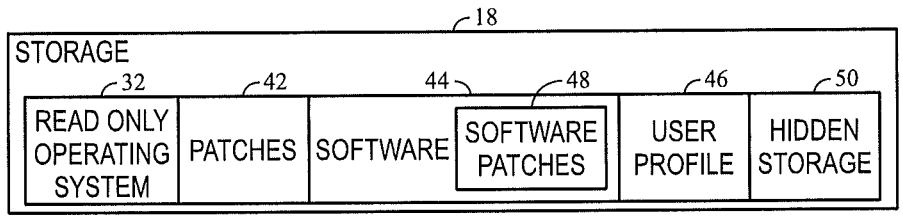
FIG. 3 illustrates another block diagram of a storage component of the computing system of FIG. 1 with containers of data organized in accordance with embodiments described herein.

Referring to FIG. 3, in addition to the read-only container 32, the processor 14 may store patches related to the operating system in container 42, various software installed on the computing system 10 in container 44, and data related to a user profile in container 46. Within the container 44, the processor 14 may store software patches within a container 48. Although the foregoing description of the various containers detailed certain types of data and software stored within the storage 18, it should be noted that the presently disclosed systems and techniques are not limited to the listed types of data and software. Instead, the items described as being stored in containers depicted in FIG. 3 are merely provided as examples and are not meant to limit the types of information and data that may be stored in accordance with the presently disclosed systems and techniques.

In one embodiment, the processor 14 may designate a portion of the storage 18 as hidden storage 50. The hidden storage container 50 may not be presented to a user of the computing system 18 as being part of the storage 18. For instance, if the storage 18 includes 200 GB of disk space, and if the hidden storage container 50 includes 100 GB of disk space, the processor 14 may indicate to the user that the storage 18 includes 100 GB of disk space. The processor 14 may then use the disk space available in the hidden storage container 50 to disable certain containers. For instance, if the processor 14 receives a request to temporarily disable a certain application stored in a particular container, the processor 14 may swap the container having the application with a similar sized container in the hidden storage 50. As such, the user may not be alarmed as to the missing disk space due to the disabling of the specified application. Instead, the user will see the same amount of disk space within the storage 18 as seen prior to disabling the application.

Figure 4:
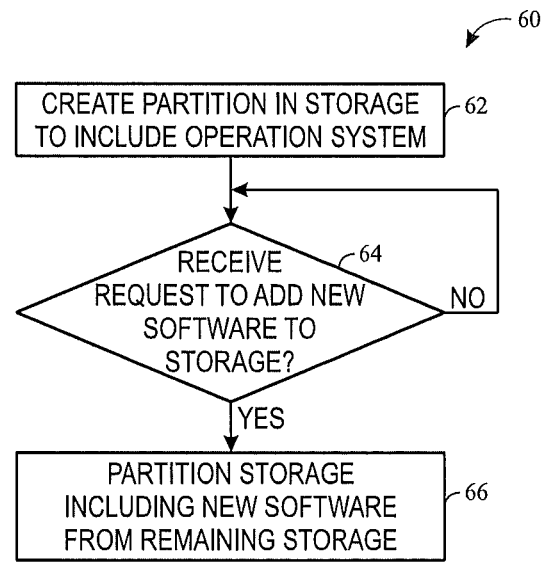
FIG. 4 illustrates a flow chart of a method for generating containers within the storage component of the computing system of FIG. 1, in accordance with embodiments described herein.

With the foregoing in mind, FIG. 4 illustrates a method 60 that may be employed by the processor 14 to organize applications and data within the storage 18 to enable a user to manage the maintenance of the computing system 10 more efficiently. Referring to FIG. 4, at block 62, the processor 14 may create a partition in the storage 18 to isolate the operating system of the computing system 10 from the remaining portion of the storage 18. As such, the processor 14 may identify the files and data associated with the operating system and create the partition in the storage 18 such that the operating system is stored within a container (e.g., container 32) without any other applications or data.

At block 64, the processor 14 may determine whether a request to add new software, applications, or data to the computing system 10 or the storage 18 is received. If the request is not received, the processor 14 may return again to block 64 and check to see if a request is received. If, however, a request to add new software, applications, or data to the storage 18 is received, the processor 14 may proceed to block 66 and partition the storage 18 such that the newly added software, application, or data is isolated within the storage 18 in a respective container.

By storing each new software, application, or data in a respective container, the processor 14 may limit the respective operations of the stored software or application to the data available within its local container. For example, certain operations of an application may use temporary files, create new files, and conduct services on a computing system as read only. In some embodiments, the application operating within a container may have access to operating system components that are used for providing the application the ability to interact with input components, displays, and the like. Meanwhile, the application may have limited access to make changes to various registers, files, or other computing components that are not related to the operation of the respective application. Moreover, when a user desires to remove or disable a software or application, the user may send a request to the processor 14 to remove or disable undesired software or applications. The processor 14 may then remove the container associated with the undesired software or application without affecting other applications. In certain embodiments, by removing the container, the processor 14 may limit the ability of the application to interact or access the processor 14 or other computing components of the computer system 10.

In certain embodiments, the processor 14 may generate containers based on periods of time (e.g., per minute, hour, day, days, week, weeks, etc.). For example, the processor 14 may generate a container for each new day. As such, each newly added application for a particular day may be stored within the same container. In addition to storing each day's applications in an individual container, the processor 14 may maintain a record (e.g., snapshot) of a state of the storage 18 for each day, or for any period of time. In this way, user may return to a previous state of the computing system 10 by instructing the processor 14 to remove containers that were added after the day or time that corresponds to the previous state. Because the storage 18 is organized in a manner in which certain periods of time may be easily identified, and because the data associated each period of time is isolated within the storage 18 in a respective container, a user may be able to return to a previous state of the computing system 10 without worrying about how the return to the previous state may affect the computing system 10. Indeed, the user is likely returning to a previous state because certain software or applications added to the computing system 10 have caused the computing system 10 to operate inefficiently, slowly, or with a general decrease in performance. Since the processor 14 has preserved the state of the computing system 10 using containers within the storage 18, the operation of the computing system 10 is improved by easily identifying newly added applications that may be the cause of decreased performance in light of a period of time in which the user may have noticed decreased performance. Moreover, the processor 14 is capable of removing software or applications that are stored within containers without affecting the software or applications that were added prior to the indicated previous state.

Figure 5:
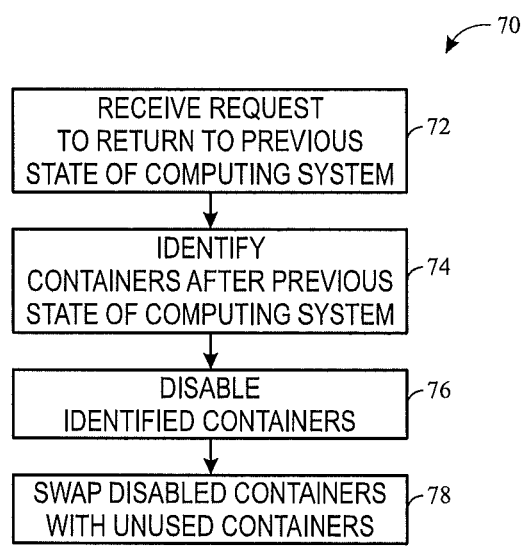
FIG. 5 illustrates a flow chart of a method for returning to a previous state of the computing system of FIG. 1, in accordance with embodiments described herein.

Keeping this in mind, FIG. 5 illustrates a method 70 for disabling or removing containers of the storage 18 in accordance with the techniques described herein. Generally, after the computing system 10 has been operating for a period of time, the performance of the computing system 10 may decrease due to various applications executing undesired processes in the background and the like. To enable users to improve the performance (e.g., speed) of the computing system 10, the processor 14 may be capable of returning to a previous state of the computing system 10. That is, the processor 14 may track the status or contents of the storage 18 at different points in time to enable the computing system 10 to return to a state when various applications were not installed on the system.

With the foregoing in mind and referring to FIG. 5, at block 72, the processor 14 may receive a request to return to a previous state of the computing system 10. The request may refer to a date, a particular application installed at some time, or the like. In one embodiment, the processor 14 may display a visual representation of the storage 18 and the containers stored thereon. As such, the user may scan the visual representation of the storage 18 to identify the order in which various applications were installed and attempt to identify when the performance of the computing system 10 began to decrease.

After receiving the request, at block 74, the processor 14 may identify one or more containers in the storage 18 that includes applications or data that was installed after the requested state of the computing system 18. In one embodiment, each container may include metadata associated with it that indicates a date in which the container was created. In another embodiment, as discussed above, each container may be associated with a period of time (e.g., day, week). As such, the processor 14 may identify the containers that were added after the requested date or time.

At block 76, the processor 14 may disable the identified containers. In one embodiment, the processor 14 may delete the contents of the identified containers. Alternatively, the processor 14 may uninstall the applications stored in the identified containers. In one embodiment, the processor 14 halts the execution of the applications within the identified containers, thereby disabling the applications without deleting the applications. In this manner, the user may disable certain applications and test whether the performance of the computing system 10 has improved after disabling the application.

In some embodiments, after disabling the identified containers, at block 78, the processor 14 may swap the disabled containers with unused containers that may be part of the hidden storage 50. As such, the disabled applications in the identified containers may be shown as being removed from the storage 18, yet still available to re-activate if the user sends the processor 14 a request to do so. By swapping the identified containers with unused containers, the operation of the computing system 10 may be improved by removing potentially problematic applications, while maintaining the ability to re-activate or reinstall the respective applications if it is determined that the respective applications is not associated with the decreased performance.

In addition to removing certain applications using containers, the processor 14 may more effectively organize the applications and data stored in the storage 18 at various times. For example, if a user has installed a number of applications and the computing system 10 has not decreased its performance after a certain period of time, the user may wish to establish the current state of the computing system 10 as a recovery state. In one embodiment, to create a recovery state of the computing system 10, the processor 14 may organize the applications, data, and the like according to certain properties of the applications, data, or the like. By way of example, the processor 14 may store certain applications or data with respect to some property (e.g., manufacturer, application type, data type) in a corresponding container. The processor 14 may then modify the containers that include the recovery state applications into read-only containers. As a result, the management of the computing system 10 may be improved by organizing various types of applications together in particular containers, such that if problems occur with certain types of applications or data, the corresponding containers may be isolated, disabled, or the like.

With this in mind, FIG. 6 illustrates a method 90 for organizing various applications or data types into certain containers. At block 92, the processor 14 may receive a request to set a current state of the computing system 10 as a recovery state.

At block 94, the processor 14 may identify similar software, applications, or data types that are stored in various containers of the storage 18. The software, applications, or data types may be identified based on their manufacturer, the type of applications, the function of the application, the type of data, the function of the data, the date in which the container was created, and the like.

After identifying similar components stored in the storage 18, at block 96, the processor 14 may create a container in the storage 18 for each grouping of the identified software, applications, or data types. For example, financial software may be stored in a separate container as compared to entertainment software, such as games. Alternatively, software manufactured or developed by one entity may be stored in a container separate form software manufactured by another entity. At block 98, the processor 14 may move each respective software, application, or data type to a corresponding container generated in block 96 based on their common grouping.

In addition to providing improved organization of applications and data stored in the storage 18, the techniques described herein may also enable the processor 14 to execute certain applications by locally streaming the execution of the applications via respective components. That is, the operating system and user interface presented via the display 22 may provide visual representations that suggest executing an application on the computing system 10. However, upon receiving an input via the visual representation (e.g., graphical interface, icon) to execute an application, the processor 14 may access the application as it is being executed in a separate container. As such, the display 22 may depict visualizations related to the execution of the applications, but the processor 14 may be accessing the container that stores the application via a pointer provided on the visual representation presented by the operating system.

With this in mind, FIG. 7 illustrates a method 110 for enabling the processor 14 to locally stream applications via containers of the storage 18. In one embodiment, when installing an application to the computing system 10, at block 112, the processor 18 may change registers or certain parameters of an operating system to indicate that certain software or applications is installed on the computing system 10. For instance, the processor 14 may create visualizations that normally would be added onto a user interface or display to indicate that an application is installed on the computing system 10.

At block 114, the processor 14 may add a pointer to the visualization that indicates a container that includes the application that corresponds to the visualization. For instance, the pointer may indicate a location within the storage 18 or a reference to a container in the storage 18 where the respective application is being executed.

When a user wishes to use a particular application, the user may then select the visualization that corresponds to the desired application. At that time (block 116), the processor 114 may receive a request to execute an application via the selection of the visualization. After receiving the request, at block 118, the processor 14 may use the pointer associated with the visualization to identify a container in which the selected application is stored. The processor 14 may then execute the application within the respective container and stream the outputs of the application to the display 22. As a result, the application may be executing on an isolated container of the storage 18 and may not affect the operation of the operating system or other applications being executed on the computing system 10.

The technical effects of the systems and methods described herein include improving the operation of the computing system 10 or any computer device by organizing applications and data within specific containers (e.g., partitions) of the storage 18. That is, by separating the storage 18 for various applications or data types, the computing system 10 limits the ability for certain applications to alter the operating system of a computing system 10, alter the execution of other applications, gain access to parts of the storage 18 that is not relevant to the certain applications, and the like.

Moreover, the present embodiments disclosed herein address post Internet problems such as the frequent download of software or updates that may include malicious programs that compromise the performance of the computing system 10. By maintaining isolation between data downloaded via the Internet at various times, the presently disclosed embodiments provide containment of malicious software and prevent the software from affecting different applications or containers within the storage 10. Furthermore, the present embodiments improve the operation of the computing system 10 by quarantining the malicious software from accessing data stored on different containers.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
 a storage component configured to store data;
 a processor configured to:
  install an application using a portion of the storage component;
  partition the portion of the storage component from a remaining portion of the storage component;
  execute the application via the portion of the storage component;
  receive a request to return to a previous state of the system;
  disable the portion of the storage component; and
  swap the portion of the storage component with another portion from the remaining portion of the storage component in response to the request, wherein the other portion is part of a hidden portion of the storage component, wherein the hidden portion is configured to be not viewable as part of the storage component by a user, and wherein swapping the portion with the other portion comprises disabling the application in the portion of the storage component by moving portion of the storage component into the hidden portion of the storage component while maintaing the ability to re-activate the application.

2. The system of claim 1, wherein the storage component comprises a second portion configured to store an operating system associated with the system, wherein the second portion is partitioned from the portion.

3. The system of claim 2, wherein the second portion is read-only.

4. The system of claim 1, wherein the storage component comprises a second portion that is partitioned from the storage component, wherein the second portion comprises:
 one or more operating system patches;
 one or more patches associated with the application;
 user profile information; or
 hidden storage.

5. The system of claim 4, wherein the portion is inaccessible to the other portion.

6. A non-transitory computer-readable medium comprising computer-executable instructions configured to, when executed, cause a processor to:
 receive a request to return to a previous state of a computing system;
 identify one or more containers in a storage device of the computing system that were added after the previous state;
 disable the one or more containers; and
 swap the one or more containers with one or more empty containers, wherein the one or more empty containers are part of a hidden portion of the storage device, wherein the hidden portion is configured to be not viewable as part of the storage device by a user of the computing system, and wherein swapping the one or more containers with the one or more empty containers comprises disabling one or more applications stored in the one or more containers by moving the one or more containers into the hidden portion of the storage device while maintaining the ability to re-activate the one or more applications.

7. The non-transitory computer-readable medium of claim 6, wherein the request comprises a date, an application previously installed on the computing system, or both.

8. The non-transitory computer-readable medium of claim 7, wherein the computer-executable instructions, when executed, cause the processor to:
 generate a plurality of containers in the storage device at a plurality of times, wherein the plurality of containers comprises the one or more containers;
 identify the one or more containers based the plurality of times and the date associated with the request; and
 disable the one or more containers.

9. The non-transitory computer-readable medium of claim 7, wherein the computer-executable instructions, when executed, cause the processor to display a visual representation comprising a plurality of containers of the storage device organized in an order in which each container of the plurality of containers was installed in response to the request, and wherein the plurality of containers comprises the one or more containers.

10. The non-transitory computer-readable medium of claim 7, wherein each of the one or more containers comprise metadata indicative of a date in which a respective container was created.

11. The non-transitory computer-readable medium of claim 7, wherein each container of a plurality of containers of the storage device is created after a period of time.

12. The non-transitory computer-readable medium of claim 7, wherein the computer-executable instructions, when executed, cause the processor to operate the computing system without the one or more containers.

13. A method, comprising:
 receiving, via a processor, a request to set a current state of a computing system as a recovery state;
 identifying, via the processor, a plurality of applications installed on a storage component of the computing system having a similar manufacturer, type, function, date of creation, or any combination thereof;
 creating, via the processor, a partition within the storage component, wherein the partition is configured to store the plurality of applications;
 moving, via the processor, the plurality of applications to the partition of the storage component;

receiving, via the PROCESSOR, an additional request to return to the recovery state of the computing system;

identifying, via the processor, one or more containers in the storage component that were added after the recovery state;

disabling, via the processor, the one or more containers; and swapping, via the processor, the one or more containers with one or more empty containers, wherein the one or more empty containers are part of a hidden portion of the storage component, wherein the hidden portion is configured to be not viewable as part of the storage component by a user of the computing system, and wherein swapping the one or more containers with the one or more empty containers comprises disabling one or more applications stored in the one or more containers by moving the one or more containers into the hidden portion of the storage component while maintaining the ability to re-activate the one or more applications.

14. The method of claim 13, comprising executing, via the processor, one of the plurality of applications by locally streaming the one of the plurality of application via the partition.

15. The method of claim 13, comprising generating, via the processor, a visualization indicative of the plurality of applications installed on the computing system, wherein the visualization comprises a pointer to the partition.

16. The method of claim 15, comprising:

receiving, via the processor, an input associated with the visualization, wherein the input is configured to cause the processor to execute one of the plurality of applications via the visualization; and identifying, via the processor, the partition based on the pointer; and executing, via the processor, the one of the plurality of applications within the partition.

17. The method of claim 13, wherein the partition comprises metadata indicative of a date in which the partition was created.

* * * * *

UNITED STATES PATENT AND TRADEMARK OFFICE
CERTIFICATE OF CORRECTION

| | | |
|---|---|---|
| PATENT NO. | : 10,089,209 B1 | Page 1 of 1 |
| APPLICATION NO. | : 15/591942 | |
| DATED | : October 2, 2018 | |
| INVENTOR(S) | : Ryan Russell | |

It is certified that error appears in the above-identified patent and that said Letters Patent is hereby corrected as shown below:

In the Specification

1. In Column 2, Line 4, delete "DRAWINGS" and insert -- BRIEF DESCRIPTION OF DRAWINGS --, therefor.

2. In Column 2, Line 61, delete "access the" and insert -- access to the --, therefor.

3. In Column 5, Line 19, delete "computing system 18" and insert -- computing system 10 --, therefor.

4. In Column 7, Line 7, delete "computing system 18." and insert -- computing system 10. --, therefor.

5. In Column 8, Line 12, delete "separate form" and insert -- separate from --, therefor.

6. In Column 8, Line 37, delete "processor 18" and insert -- processor 14 --, therefor.

7. In Column 8, Lines 52-53, delete "processor 114" and insert -- processor 14 --, therefor.

8. In Column 9, Line 16, delete "storage 10." and insert -- storage 18. --, therefor.

In the Claims

9. In Column 9, Line 51, in Claim 1, delete "while maintaing" and insert -- while maintaining --, therefor.

10. In Column 10, Line 33, in Claim 8, delete "based the" and insert -- based on the --, therefor.

11. In Column 11, Line 1, in Claim 13, delete "PROCESSOR," and insert -- processor, --, therefor.

Signed and Sealed this
Fifteenth Day of January, 2019

Andrei Iancu
*Director of the United States Patent and Trademark Office*